United States Patent [19]
Lee

[11] Patent Number: 5,224,869
[45] Date of Patent: Jul. 6, 1993

[54] SLIDABLE DOOR APPARATUS FOR COVERING A SOCKET OF A COMPUTER

[75] Inventor: Sam S. Lee, Taipei, Taiwan

[73] Assignee: Samtech Corporation, Taipei, Taiwan

[21] Appl. No.: 973,290

[22] Filed: Nov. 9, 1992

[51] Int. Cl.⁵ ............................................. H01R 13/44
[52] U.S. Cl. ................. 439/136; 312/223.2; 312/310
[58] Field of Search ............... 439/131, 135, 136, 149; 312/223.2, 223.6, 310; 364/708; 49/130, 507

[56] References Cited

U.S. PATENT DOCUMENTS

| | | | |
|---|---|---|---|
| 4,729,614 | 3/1988 | Nadler et al. | 312/310 X |
| 4,914,265 | 4/1990 | Mongeau | 439/136 X |
| 4,993,962 | 2/1991 | Noda et al. | 439/136 |
| 5,135,406 | 8/1992 | Ishikawa | 439/136 X |

OTHER PUBLICATIONS

IBM Technical Disclosure Bulletin, vol. 31, No. 7, Dec. 1988.

*Primary Examiner*—Larry I. Schwartz
*Assistant Examiner*—Khiem Nguyen
*Attorney, Agent, or Firm*—Christensen, O'Connor, Johnson & Kindness

[57] ABSTRACT

A slidable door apparatus for a socket of a computer includes a movable plate, a slidable door, a resilient assembly, two sliding ribs and two sliding grooves. The computer includes a lower casing and a middle casing. The lower casing has a socket opening formed through a side wall thereof and includes a recess formed in the side wall of the lower casing beside the socket opening. The movable plate is mounted movably between the lower casing and the middle casing. The slidable door is mounted slidably between the lower casing and the middle casing in alignment with the movable plate so as to cover the socket opening. The resilient assembly is interposed between the movable plate and the side wall of the lower casing. The two guiding grooves are respectively formed in the upper portion and the lower portion of the slidable door. The two guiding ribs are respectively projects from the lower casing and upper casing of the computer and are engaged with the two guiding grooves so as to slide the slidable door between a first position, wherein the slidable door closes the socket opening, and a second position, wherein the slidable door removes from the socket opening to cover the movable plate.

6 Claims, 5 Drawing Sheets

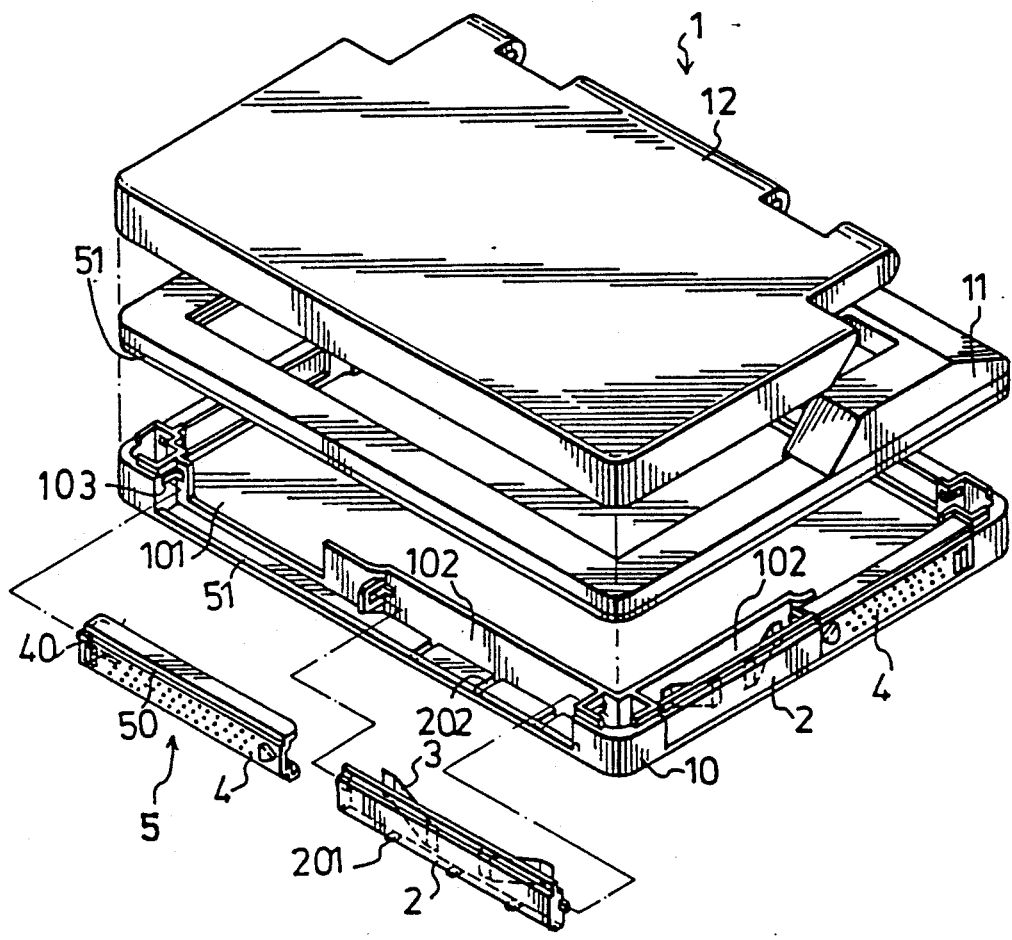
F I G. 2

SLIDABLE DOOR APPARATUS FOR COVERING A SOCKET OF A COMPUTER

BACKGROUND OF THE INVENTION

1. Field of the Invention

This invention relates to a door apparatus for covering a socket of a computer, more particularly to a door apparatus in which a door is slidable to open and close the socket of the computer.

2. Description of the Related Art

Referring to FIG. 1, a common portable computer (A) is shown to comprise a socket opening (A1) for a socket (not shown). A conventional door apparatus (B) covers the socket opening (A1) so as to prevent dust from accumulation on the periphery of the socket. The computer casing has two aligned holes (A2,A3) formed therein on two sides of the socket opening (A1). The door apparatus (B) includes an elongated door body (B1). Two projections (B2,B3) protrude endwise from a lower left side and a lower right side of the door body (B1) to engage within the holes (A2,A3) of the computer (A) so that the door body (B1) can be rotated relative to the computer (A) between a vertical position and a horizontal position.

The drawback of the above-described door apparatus (B) is that the projections (B2,B3) are easily broken when the door body (B1) is in a horizontal position.

SUMMARY OF THE INVENTION

The main object of this invention is to provide a durable door apparatus for a socket of a computer.

According to this invention, a slidable door apparatus for a socket of a computer includes a movable plate, a slidable door, a resilient assembly and mounting means. The computer includes a lower casing and a middle casing which has a bottom end connected securely to the upper end of the lower casing. The lower casing has a socket opening formed through a side wall thereof. The lower casing further includes a recess formed in the side wall of the lower casing beside the socket opening. The movable plate is mounted movably between the lower casing and the middle casing. The movable plate covers the recess of the lower casing and can be pressed into the recess of the lower casing. The slidable door is mounted slidably between the lower casing and the middle casing in alignment with the movable plate so as to cover the socket opening. The resilient assembly is interposed between the movable plate and the side wall of the lower casing so as to bias the movable plate to move away from the side wall of the lower casing, thereby aligning the movable plate with the slidable door. The mounting means mounts the slidable door between the lower casing and the middle casing so as to guide the slidable door between a first position, wherein the slidable door closes the socket opening, and a second position, wherein the slidable door removes from the socket opening to cover the movable plate. When the movable plate is pressed into the recess, the slidable door can slide from the first position to the second position so as to uncover the socket opening of the lower casing.

BRIEF DESCRIPTION OF THE DRAWINGS

Other features and advantages of the present invention will become apparent in the following detailed description of the preferred embodiments, with reference to the accompanying drawings, of which:

FIG. 2 is an exploded view of a slidable door apparatus for covering a socket of a computer according to the first embodiment of this invention;

DETAILED DESCRIPTION OF THE PREFERRED EMBODIMENTS

Figure 1:
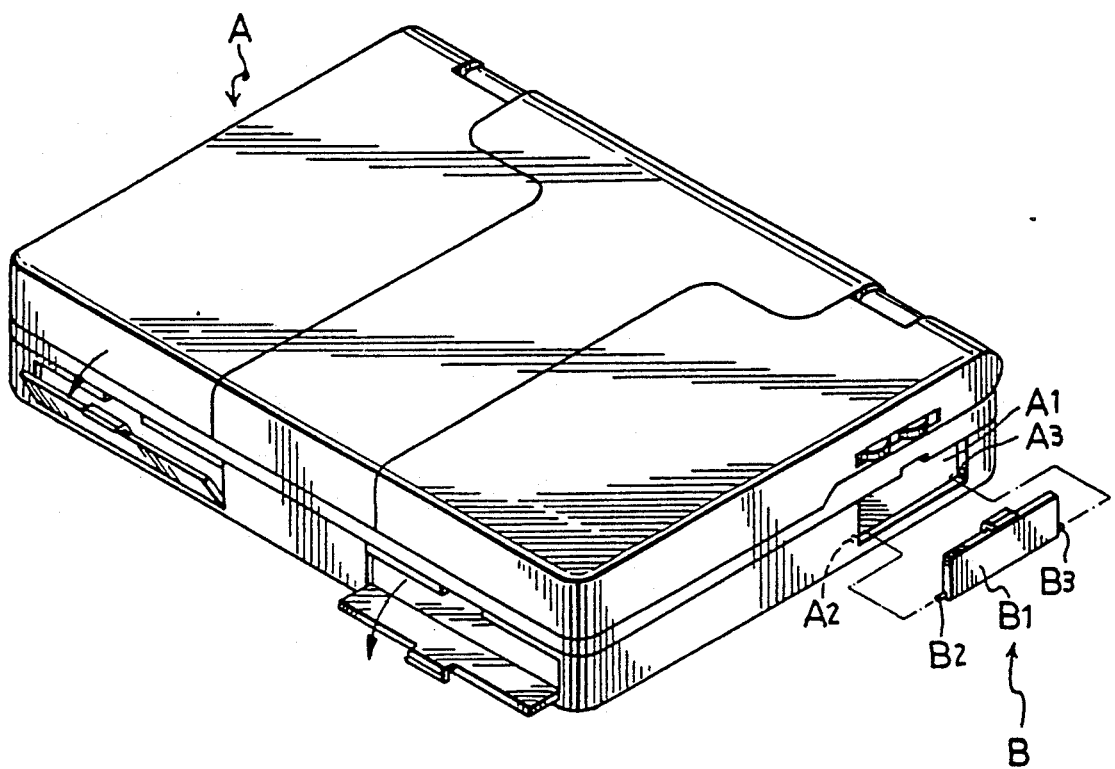
FIG. 1 is a perspective view of a common portable computer which is provided with a conventional door apparatus.
Figure 3:
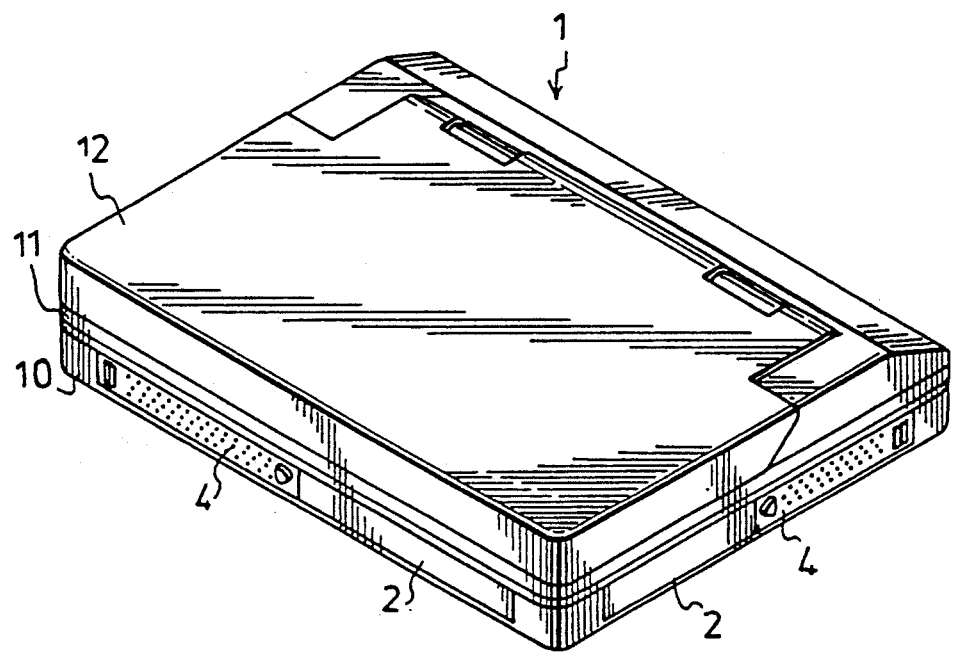
FIG. 3 is a perspective view of the slidable door apparatus according to the first embodiment of this invention.

Referring to FIGS. 2, and 3, a portable computer (1) includes a lower casing (10), a middle casing (11) having a bottom end connected securely to the upper end of the lower casing (10), and an upper casing (12) having a bottom end connected securely to the upper end of the middle casing (11). The lower casing (10) has two socket openings (101) and includes two recesses (102). Each of the socket openings (101) is formed through a side wall of the lower casing and has a receiving hole (103) adjacent to the opening (101). Each of the recesses (102) is formed in the side wall of the lower casing (10) beside the socket opening (101). Two slidable door apparatuses, according to this invention, are provided on the portable computer (1) so as to cover the two socket openings (101). Each of the two apparatuses includes a movable plate (2), a resilient assembly (3), a slidable door (4) and a mounting means (5).

The movable plate (2) has a plurality of aligned guiding projections (201) projecting downward from the lower end thereof. The lower casing (10) of the computer (1) has a plurality of guiding grooves (202) which extend in a direction perpendicular to the movable plate (2). The guiding grooves (202) are engaged with the guiding projections (201) respectively so that the guiding projections (201) of the movable plate (2) can be moved along the guiding grooves (202) of the lower casing (10) so as to guide the movable plate (2) into the recess (102) of the lower casing (10).

The resilient assembly (3) interconnects the movable plate (2) and the side wall of the lower casing (10). In this embodiment, the resilient assembly (3) includes two spring plates. Both of the two spring plates have one end secured to the movable plate (2).

The slidable door (4) is mounted slidably between the lower casing (10) and the middle casing (11) of the computer (1). The resilient assembly (3) biases the movable plate (2) to move away from the side wall of the lower casing (10) so as to align the movable plate (2) with the slidable door (4). When covering the socket opening (101), the slidable door (4) is in alignment with the movable plate (2). A protrusion (40) protrudes endwise from a side wall of the slidable door (4).

The mounting means (5) mounts the slidable door (4) between the lower casing (10) and the middle casing (11) so as to guide the slidable door (4) to slide between a first position, wherein the slidable door (4) closes the socket opening (101), and a second position, wherein the slidable door (4) removes from the socket opening (101) to cover the movable plate (2). The mounting means (5) includes two sliding grooves (50) and two sliding ribs (51). One of the sliding grooves (50) is formed in the lower portion of the slidable door (4) and the other one of the sliding grooves (50) is formed in the upper portion of the slidable door (4). One of the sliding ribs (51) projects upward from the lower casing (10) of the computer (1) and the other of the sliding ribs (51) projects downward from the middle casing (11) of the computer (1). The sliding ribs (51) are engaged with the sliding grooves (50) so as to slide the slidable door between the first and the second position. When the slidable door (4) is in the first position, the protrusion (40) of the slidable door (4) is engaged in the receiving hole (103) of the lower casing (10).

Figure 4:
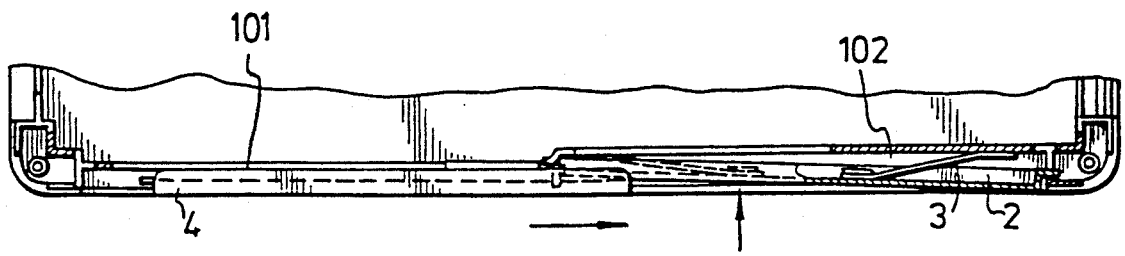
FIG. 4 is a schematic view illustrating the operation of the slidable door apparatus according to the first embodiment of this invention.

Referring to FIG. 4, when a user wants to open the socket opening (101) of the computer (1), the movable plate (2) is pressed into the recess (102) so as to pull or push the slidable door (4) to the second position. If the user wants to close the socket opening (101) of the computer (1), the slidable door (4) is pulled or pushed to the first position. When the socket opening (101) is closed, the movable plate (2) is biased to align with the slidable door (4) by the resilient assembly (3).

Figure 5:
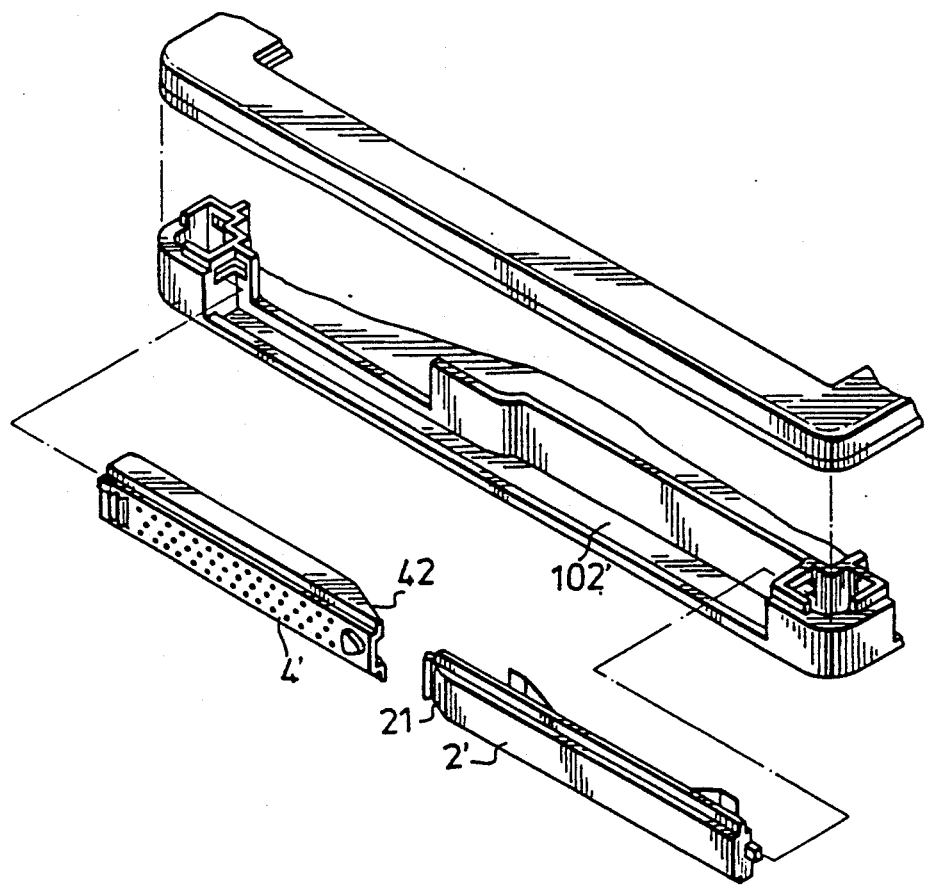
FIG. 5 is an exploded view of the slidable door apparatus according to a second embodiment of this invention.

Referring to FIG. 5, the second embodiment of this invention is shown. Unlike the first embodiment, the movable plate (2') has an inclined surface (21). The slidable door (4') also has an inclined surface (42) which abuts against the inclined surface (21) of the movable plate (2') so as to press the movable plate (2') into the recess (102') of the lower casing (10') by sliding the slidable door (4') from the first position to the second position.

Figure 6:
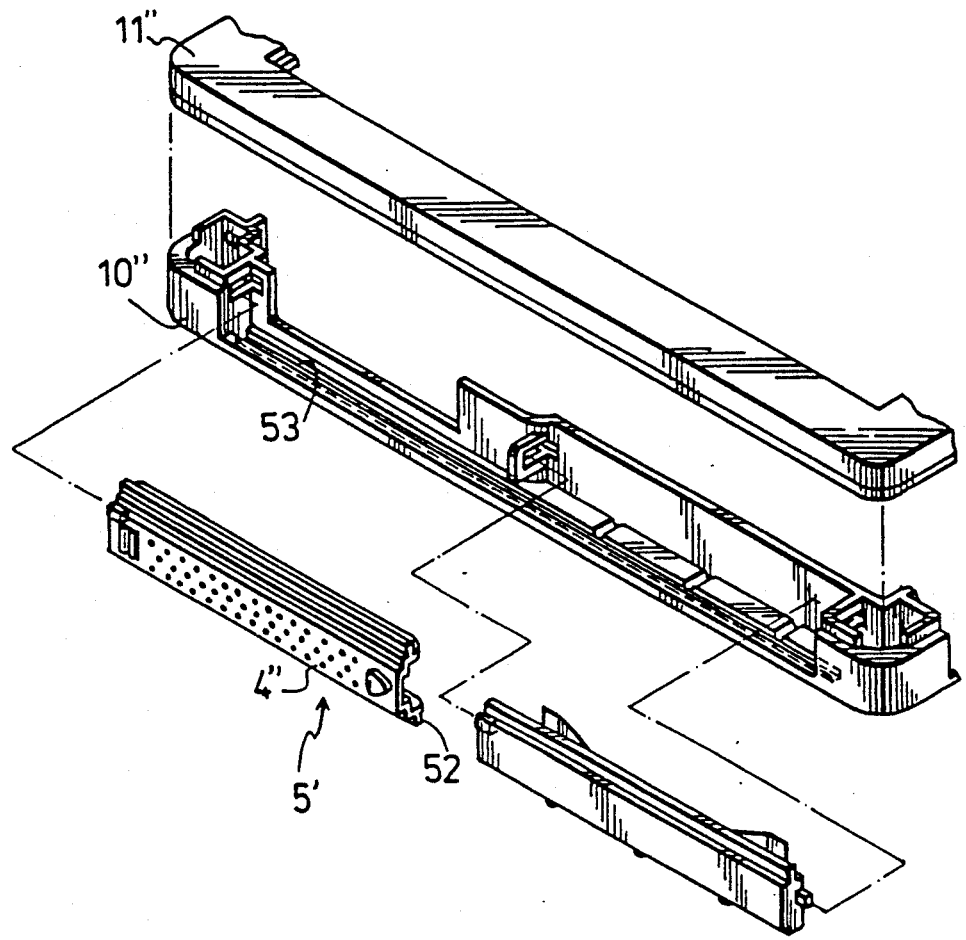
FIG. 6 is an exploded view of the slidable door apparatus according to a third embodiment of this invention.

Referring to FIG. 6, the third embodiment of this invention is shown. The mounting means (5') includes two sliding ribs (52) and two sliding grooves (53). Unlike the first and second embodiments, one of the sliding ribs (52) projects downward from the lower portion of the slidable door (4"), while the other of the sliding ribs (52) projects upward from the upper portion of the slidable door (4"). One of the sliding grooves (53) is formed in the lower casing (10"), while the other of the sliding grooves (53) is formed in the upper casing (11").

Figure 7:
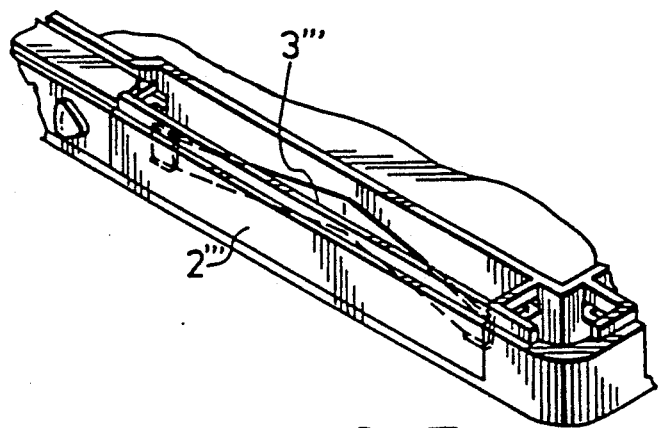
FIG. 7 is a perspective view showing a portion of the slidable door apparatus according to a fourth embodiment of this invention.

Referring to FIG. 7, the fourth embodiment of this invention is shown. Unlike the above embodiments, the resilient assembly (3''') of this embodiment includes only one spring plate which has both ends secured to the movable plate (2''').

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A slidable door apparatus for a socket of a computer, said computer including a lower casing and a middle casing having a bottom end connected securely with an upper end of said lower casing, said lower casing having a socket opening formed through a side wall thereof, said slidable door apparatus comprising:

a recess formed in said side wall of said lower casing beside said socket opening;

a movable plate mounted movably between said lower casing and said middle casing, said movable plate covering said recess of said lower casing and being capable of being pressed into said recess of said lower casing;

a slidable door mounted slidably between said lower casing and said middle casing in alignment with said movable plate so as to cover said socket opening;

a resilient assembly interposed between said movable plate and said side wall of said lower casing so as to bias said movable plate to move away from said side wall of said lower casing, thereby aligning said movable plate with said slidable door; and means for mounting said slidable door between said lower casing and said middle casing so as to guide said slidable door to slide between a first position, wherein said slidable door closes said socket opening, and a second position, wherein said slidable door removes from said socket opening to cover said movable plate; whereby, when said movable plate is pressed into said recess, said slidable door can slide from said first position to said second position so as to uncover said socket opening of said lower casing.

2. A slidable door apparatus as claimed in claim 1, wherein said movable plate has an inclined surface, said slidable door having an inclined surface which abuts against said inclined surface of said movable plate so as to press said movable plate into said recess of said lower casing by sliding said slidable door from said first position to said second position.

3. A slidable door apparatus as claimed in claim 1, wherein said slidable door has an upper portion and a lower portion, said mounting means including:

two sliding ribs, one of said sliding ribs projecting upward from said lower casing of said computer, the other of said sliding ribs projecting downward from said middle casing of said computer; and two sliding grooves, one of said sliding grooves being formed in said lower portion of said slidable door, the other of said sliding grooves being formed in said upper portion of said slidable door, said sliding ribs being engaged with said sliding grooves so as to slide said slidable door between said first position and said second position.

4. A slidable door apparatus as claimed in claim 1, wherein said movable plate has a plurality of aligned guiding projections projecting downward from a lower end thereof, said lower casing of said computer having a plurality of aligned guiding grooves which extend in a direction perpendicular to said movable plate, said guiding grooves being engaged with said guiding projections respectively, whereby, said guiding projections of said movable plate can be moved along said guiding grooves of said lower casing so as to guide said movable plate into said recess of said lower casing.

5. A slidable door apparatus as claimed in claim 1, wherein said resilient assembly is a spring plate which is secured to said movable plate.

6. A slidable door apparatus as claimed in claim 5, wherein said slidable door is elongated and has a protrusion protruding endwise from a side wall thereof, said lower casing having a receiving hole adjacent to said socket opening, when said protrusion of said slidable door is engaged in said receiving hole of said lower casing, said slidable door is in said first position.

* * * * *